US010479544B2

(12) United States Patent
Crosby et al.

(10) Patent No.: US 10,479,544 B2
(45) Date of Patent: Nov. 19, 2019

(54) REUSABLE CUP WITH INTEGRATED RIBBED HEAT SINK SHEATH

(71) Applicant: Airlite Plastics Co., Omaha, NE (US)

(72) Inventors: Brad Crosby, Omaha, NE (US);
Carter Ash, Flower Mound, TX (US);
Brent Frazier, Bellevue, NE (US);
David Hull, Chicago, IL (US)

(73) Assignee: Airlite Plastics Co., Omaha, NE (US)

( * ) Notice: Subject to any disclaimer, the term of this patent is extended or adjusted under 35 U.S.C. 154(b) by 399 days.

(21) Appl. No.: 14/941,156

(22) Filed: Nov. 13, 2015

(65) Prior Publication Data

US 2016/0137332 A1 May 19, 2016

Related U.S. Application Data

(60) Provisional application No. 62/079,397, filed on Nov. 13, 2014.

(51) Int. Cl.
*B65D 1/26* (2006.01)
*B65D 1/40* (2006.01)
(Continued)

(52) U.S. Cl.
CPC ............ *B65D 1/265* (2013.01); *B65D 1/40* (2013.01); *B65D 21/0209* (2013.01); *B65D 21/0233* (2013.01); *B65D 25/205* (2013.01); *B65D 43/0212* (2013.01); *B65D 81/3865* (2013.01); *B65D 2543/0074* (2013.01);
(Continued)

(58) Field of Classification Search
CPC ............ B65D 81/3869; B65D 81/3874; B65D 81/3876; B65D 81/3865; B65D 1/265; B65D 1/40; B65D 3/06; B65D 3/28; B65D 21/0233; B65D 21/0209; B65D 25/36; B65D 25/205; B65D 43/0212; B65D 2543/00657; B65D 2543/00685;
(Continued)

(56) References Cited

U.S. PATENT DOCUMENTS 2,984,035 A    5/1961   Nalle, Jr.
3,085,730 A    4/1963   Fibish
(Continued)

OTHER PUBLICATIONS

Photograph of product manufactured in Apr. 2014.
(Continued)

*Primary Examiner* — Chun Hoi Cheung
*Assistant Examiner* — Brijesh V. Patel
(74) *Attorney, Agent, or Firm* — Banner & Witcoff, Ltd.

(57) ABSTRACT

Aspects of the disclosure relate to a cup including a base, a sidewall extending upward from the base to a top of the cup to define an internal cavity and an open top, wherein the sidewall includes an upper sidewall and a lower sidewall located between the upper sidewall and the base. The lower sidewall can include a lower wall and a plurality of raised ribs extending radially outward from the lower wall and being separated by recesses and the ribs and recesses being elongated in a direction between the top and the base. The cup can include an annular ledge connects the upper sidewall to the lower sidewall, wherein the annular ledge extends inwardly from the upper sidewall to the lower sidewall and forms a reduction in width of the sidewall between the upper sidewall and the lower sidewall.

14 Claims, 12 Drawing Sheets

(51) Int. Cl.
    *B65D 21/02* (2006.01)
    *B65D 25/20* (2006.01)
    *B65D 81/38* (2006.01)
    *B65D 43/02* (2006.01)

(52) U.S. Cl.
    CPC .............. *B65D 2543/00657* (2013.01); *B65D 2543/00685* (2013.01); *B65D 2543/00796* (2013.01); *Y02W 30/807* (2015.05)

(58) Field of Classification Search
    CPC .. B65D 2543/00796; B65D 2543/0074; A47G 23/0216; A47G 23/0233; A47G 19/2288
    USPC .................................. 220/669–672; 229/403
    See application file for complete search history.

(56) References Cited

U.S. PATENT DOCUMENTS

| | | | |
|---|---|---|---|
| 3,139,213 A | | 6/1964 | Edwards |
| 3,194,468 A | | 7/1965 | Baron |
| 3,223,305 A | | 12/1965 | Edwards |
| D204,783 S | | 5/1966 | Johnson |
| 3,437,253 A | | 4/1969 | McDonald et al. |
| 3,606,262 A | | 9/1971 | Hoff |
| D248,358 S | | 7/1978 | Thomas |
| D271,650 S | | 12/1983 | Groenewold et al. |
| 5,071,060 A | * | 12/1991 | DeFelice .............. B65D 1/265 220/675 |
| 5,226,585 A | * | 7/1993 | Varano ............... A47G 19/2288 229/400 |
| 5,415,339 A | * | 5/1995 | Howard ................ B65D 3/06 220/671 |
| D362,156 S | | 9/1995 | Goto et al. |
| D370,389 S | * | 6/1996 | Wilson ............................ D7/523 |
| D371,936 S | | 7/1996 | Goto et al. |
| 5,669,553 A | * | 9/1997 | Smith ................ A47G 23/0216 220/738 |
| 5,713,512 A | * | 2/1998 | Barrett .................... B65D 3/22 220/592.17 |
| 5,765,716 A | * | 6/1998 | Cai .................... A47G 23/0216 220/375 |
| D402,556 S | | 12/1998 | Frye |
| D417,845 S | | 12/1999 | Sadlier et al. |
| 6,053,352 A | * | 4/2000 | Cai .................... A47G 23/0216 220/671 |
| D453,447 S | * | 2/2002 | Bi ................................. D7/523 |
| 6,412,300 B2 | * | 7/2002 | Kaposi ............... A47G 19/2288 62/457.2 |
| D514,884 S | | 2/2006 | Smith et al. |
| 7,134,566 B2 | | 11/2006 | Smith et al. |
| D590,662 S | | 4/2009 | Cheng |
| D591,595 S | | 5/2009 | Tedford, Jr. |
| 7,591,393 B2 | | 9/2009 | Crudgington, Jr. |
| D621,659 S | | 8/2010 | Liu |
| D623,474 S | | 9/2010 | Carlson et al. |
| D623,476 S | | 9/2010 | Carlson et al. |
| D635,397 S | | 4/2011 | Hollis et al. |
| D642,862 S | | 8/2011 | Tobias |
| D642,863 S | | 8/2011 | Tobias |
| D642,864 S | | 8/2011 | Tobias |
| D649,397 S | * | 11/2011 | Wilkens ................ B65D 1/265 D7/396.2 |
| D649,878 S | | 12/2011 | Weiss |
| 8,100,289 B1 | | 1/2012 | Tobias |
| D655,983 S | | 3/2012 | Cozzolino et al. |
| D656,365 S | | 3/2012 | Bickert et al. |
| D657,670 S | | 4/2012 | Folos et al. |
| D658,057 S | | 4/2012 | Donat |
| D658,443 S | | 5/2012 | Chiu et al. |
| D660,696 S | | 5/2012 | Weiss |
| D662,354 S | | 6/2012 | Bodum |
| D664,001 S | | 7/2012 | Liu |
| D666,490 S | | 9/2012 | Leon |
| 8,336,732 B1 | | 12/2012 | Tobias |
| D675,524 S | | 2/2013 | Bickert et al. |
| D683,186 S | | 5/2013 | Tobias |
| D696,906 S | | 1/2014 | Roth |
| D696,940 S | | 1/2014 | Hale et al. |
| D716,141 S | | 10/2014 | Rush |
| D720,616 S | | 1/2015 | Lam |
| D721,584 S | | 1/2015 | Koennecke |
| D740,611 S | | 10/2015 | Crosby et al. |
| 2001/0050287 A1 | * | 12/2001 | Namba .................. B65D 1/265 220/592.17 |
| 2004/0031714 A1 | | 2/2004 | Hanson |
| 2006/0071008 A1 | | 4/2006 | Sadlier |
| 2006/0243734 A1 | | 11/2006 | Tedford |
| 2007/0044917 A1 | | 3/2007 | Jiang |
| 2007/0205128 A1 | * | 9/2007 | Davis ....................... B65D 1/26 206/503 |
| 2009/0071967 A1 | | 3/2009 | Park |
| 2010/0012657 A1 | | 1/2010 | Levey |
| 2011/0139800 A1 | | 6/2011 | Urban |
| 2013/0037558 A1 | | 2/2013 | Selina et al. |
| 2013/0056463 A1 | | 3/2013 | Buck |
| 2015/0083791 A1 | | 3/2015 | Gonzalez et al. |
| 2015/0342380 A1 | * | 12/2015 | Letica ............... A47G 19/2288 229/403 |

OTHER PUBLICATIONS

Photograph of product manufactured in Jun. 2013.
Jan. 28, 2016—(WO) International Search Report and Written Opinion—App PCT/US2015/060682.

* cited by examiner

REUSABLE CUP WITH INTEGRATED RIBBED HEAT SINK SHEATH

CROSS-REFERENCE TO RELATED APPLICATIONS

This application claims the benefit of U.S. Provisional Patent Application No. 62/079,397 entitled "Reusable Container with Integrated Ribbed Heat Sink Sheath" and filed on Nov. 13, 2014 which is incorporated by reference herein in its entirety.

TECHNICAL FIELD

Aspects of the disclosure generally relate to cups and methods of manufacturing cups with integrated features.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

In an embodiment, a cup can include a sidewall extending upward from the base to a top of the cup to define an internal cavity and an open top. In an embodiment the sidewall includes an upper sidewall. In an embodiment, at least a portion of the upper sidewall decreases in width in a downward direction from the top toward the base. In an embodiment, the upper sidewall includes a foot extending downwardly from a bottom portion of the upper sidewall. The foot can include an underside edge of the upper sidewall and the foot defines a channel between the upper sidewall and the lower sidewall.

In an embodiment, the sidewall also includes a lower sidewall located between the upper sidewall and the base. In an embodiment, the lower sidewall decreases in width in the downward direction. In an embodiment, the lower sidewall includes a lower wall and a plurality of raised ribs extending radially outward from the lower wall and being elongated in a direction between the top and the base. In an embodiment, the ribs are distributed around a periphery of the lower wall and are separated by recesses that are elongated in the direction between the top and the base. In an embodiment, the ribs converge towards each other from the top toward the base. In an embodiment, a maximum ratio of radial thickness of the ribs to radial thickness of the lower wall is about 3:1 and at least a portion of a radial thickness of the ribs tapers from the top toward the base. In an embodiment, an outer surface area of the lower sidewall is between about 200% and 250% greater than an outer surface area of the lower wall if the lower sidewall did not have the ribs. In an embodiment, the ribs cover between about 70% to about 80% of the height of the cup.

In an embodiment, the cup includes an annular ledge connecting the upper sidewall to the lower sidewall. In an embodiment, the annular ledge extends inwardly from the upper sidewall to the lower sidewall and forms a reduction in width of the sidewall between the upper sidewall and the lower sidewall, such that a maximum width of the lower sidewall is less than a minimum width of the upper sidewall.

BRIEF DESCRIPTION OF THE DRAWINGS

A more complete understanding of the present disclosure and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration, various embodiments of the disclosure that may be practiced. It is to be understood that other embodiments may be utilized.

Referring generally to FIGS. 1-11, an example of a reusable cup 10 with integrated ribbed heat sink sheath 12 is shown. The cup 10 includes a base 14 and sidewall 16. The sidewall 16 extends upward from the base 14 to a top 18 of the cup 10 to define an internal cavity 20 and an opening 22 in the top 18. The base 14 and sidewall 16 can be of multiple dimensions to define multiple volumes of the internal cavity 20. In an embodiment, the base and sidewall is configured so the cup is of, for example, between about 8 oz. to about 30 oz. or more. In preferred embodiments, the cup 10 can be configured to be in 12 oz., 16 oz., 18 oz., 20 oz., and 24 oz. sizes. The top 18 can include a lip 24. The lip 24 can be configured to cooperate with lid to secure lid to the top 18 of the cup 10.

Figure 7:
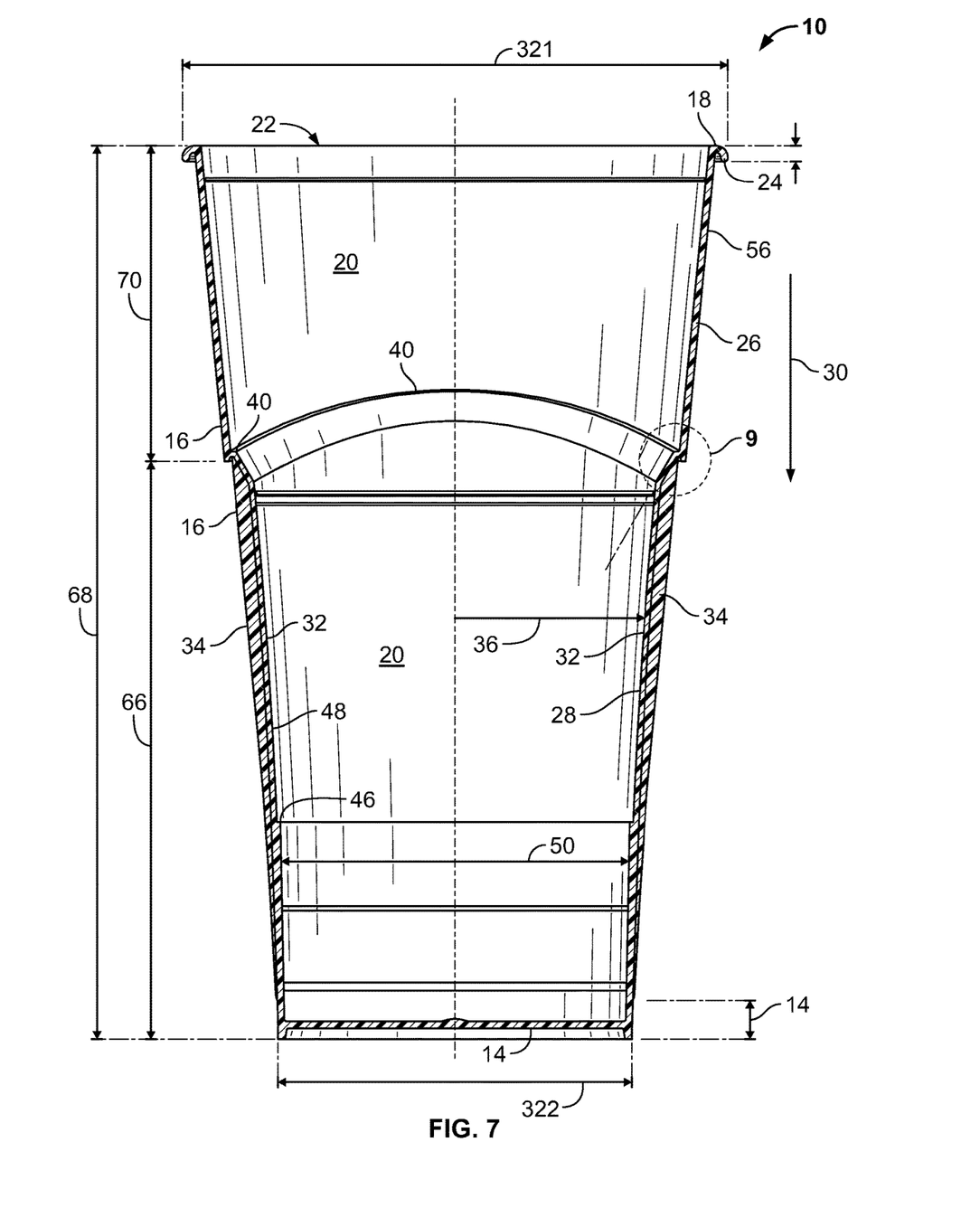
FIG. 7 is a vertical cross-sectional view take along Line 7 of FIG. 6 of the example cup with integrated ribbed heat sink sheath in accordance with aspects of this disclosure.

In an embodiment, the sidewall 16 includes an upper sidewall 26 and a lower sidewall 28. In an embodiment, the upper sidewall 26 generally decreases in width in a downward direction 30 from the top toward the base. The term "width" as used herein, and unless stated otherwise, means the outermost horizontal width of the feature. For example, the width 321 of the cup 10 and the width 322 of the base 14 are shown by example in FIG. 7. In an embodiment, at least a portion of the upper sidewall 26 can decrease in width in the downward direction 30. In an embodiment, the upper sidewall 26 can have same width over at least a portion or substantially all of the upper sidewall 26. Referring to FIG. 7, in an embodiment, the height 70 of the upper sidewall is between about 30% to about 20% of the height 68 of the cup 10. In an embodiment, the height 70 of the upper sidewall is between about 30% to about 10% of the height 68 of the cup 10.

In an embodiment, the cup 10 includes a lower sidewall 28 located in between the upper sidewall 26 and the base 14. In an embodiment, the lower sidewall 28 generally decreases in width in a downward direction 30 from the top toward the base. In an embodiment, at least a portion of the lower sidewall 28 decreases in width in the downward direction 30. In an embodiment, the lower sidewall 28 has the same width over at least a portion or substantially all of the lower sidewall 28.

In an embodiment, the lower sidewall 28 includes a lower wall 32 and a plurality of raised ribs 34 extending in a radial direction 36 (radially) outward from the lower wall 32. In an embodiment, the ribs are configured to be elongated in a direction between the top and the base. In an embodiment, the ribs 34 are distributed around a periphery of the lower wall 32 and are separated by recesses 38 that are elongated in the direction between the top and the base. In an embodiment, the elongated ribs 34 and recesses 38 can include generally straight ribs and recesses, angled ribs and recesses, and/or curved ribs and recesses (and combinations of the same). In an embodiment, the ribs 34 cover between about 70% to about 80% of the height 68 of the cup 10. In an embodiment, the ribs 34 cover between about 70% to about 90% of the height of the cup 10. In an embodiment, the ribs cover substantially all of the sidewall 16. In an embodiment, the height 66 of the lower sidewall is between about 70% to about 80% of the height 68 of the cup 10. In an embodiment, the height 66 of the lower sidewall is between about 70% to about 90% of the height 68 of the cup 10. In multiple embodiments, the ribs 34 and recesses 38 can be configured in one or more configurations and over one or more heights of the cup in accordance with this disclosure for both aesthetic and functional purposes.

Figure 1:
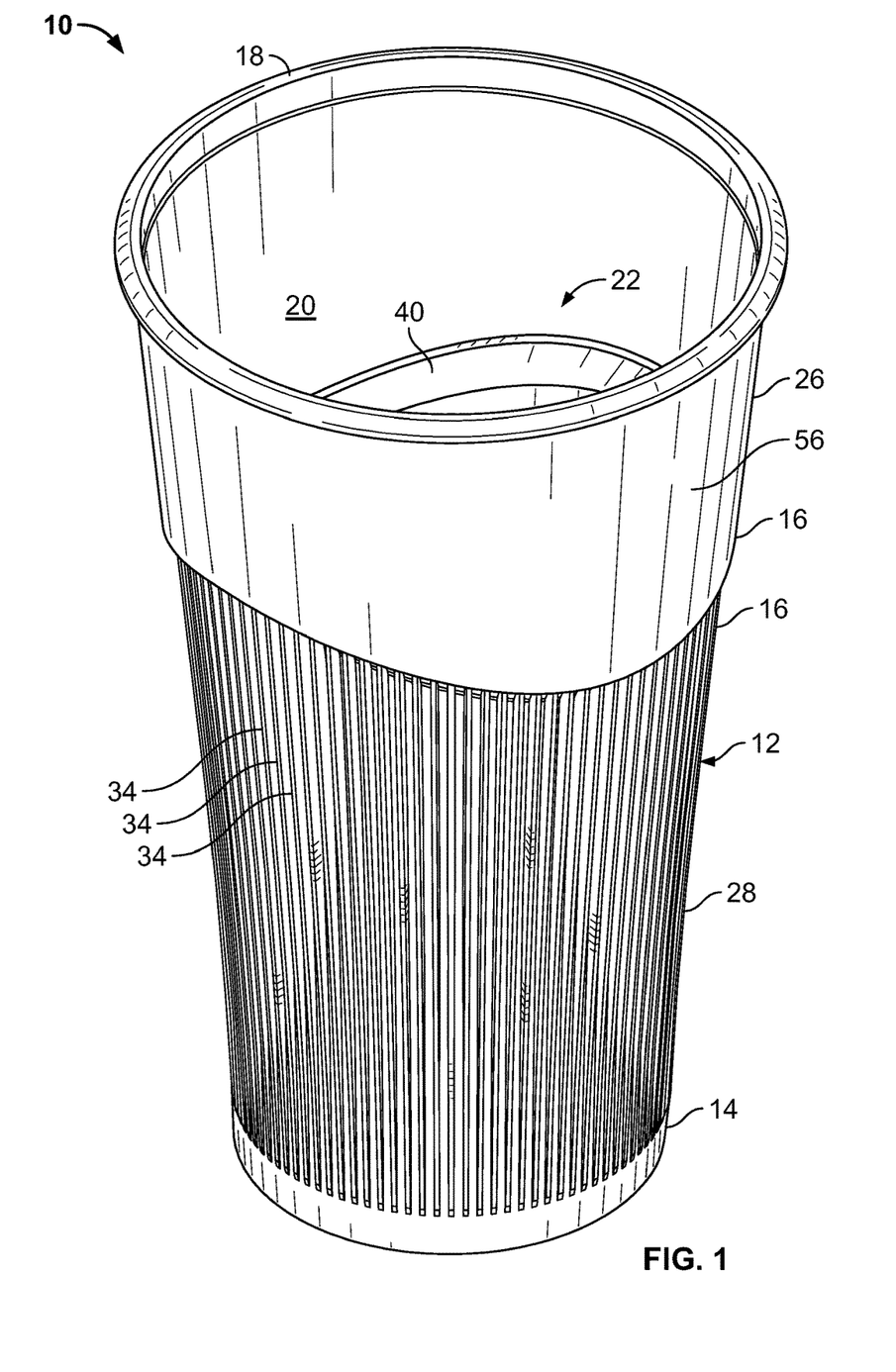
FIG. 1 is top, front-left perspective view of an example cup with integrated ribbed heat sink sheath in accordance with aspects of this disclosure.
Figure 2:
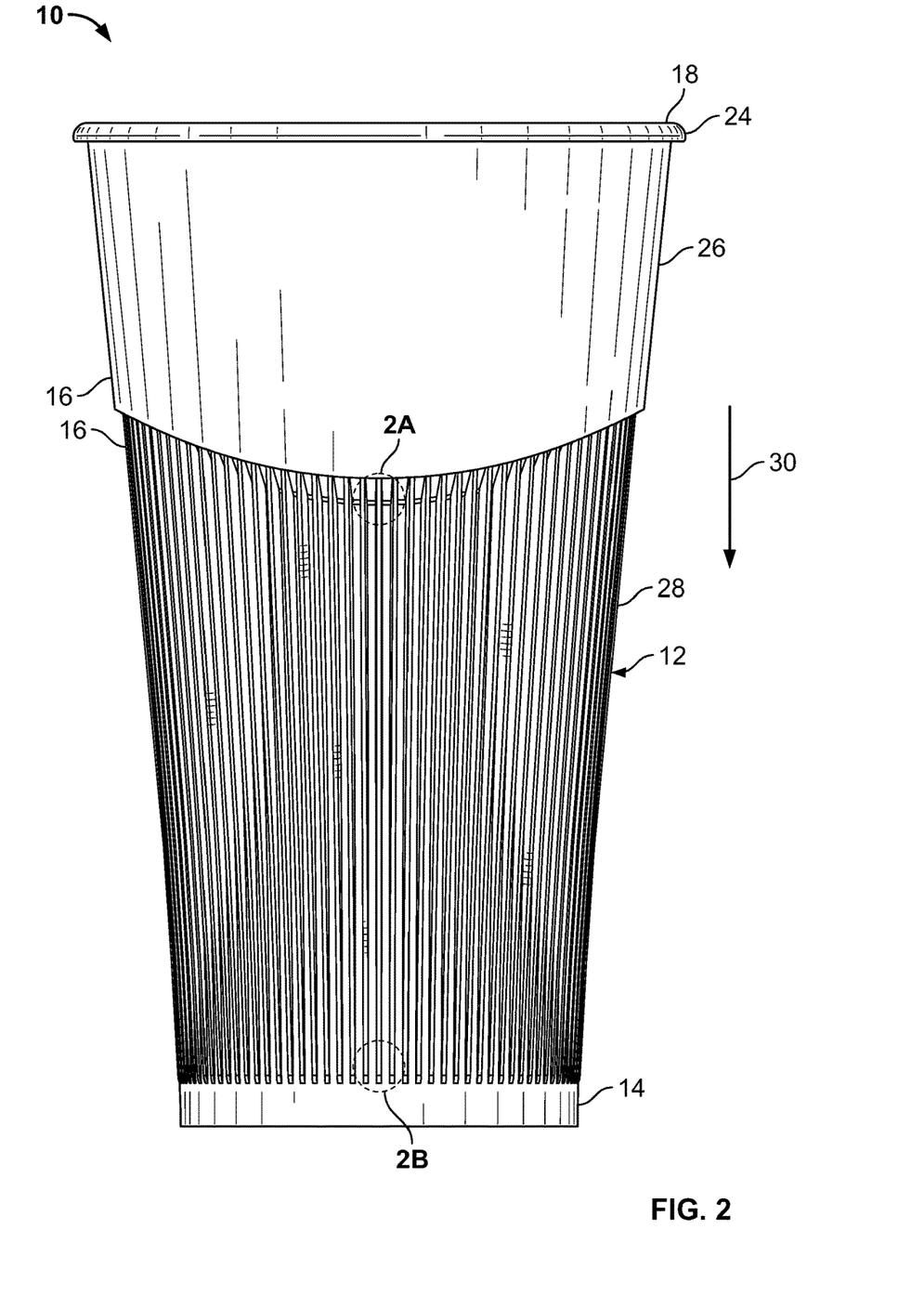
FIG. 2 is front view of the example cup with integrated ribbed heat sink sheath in accordance with aspects of this disclosure.
Figure 2A:
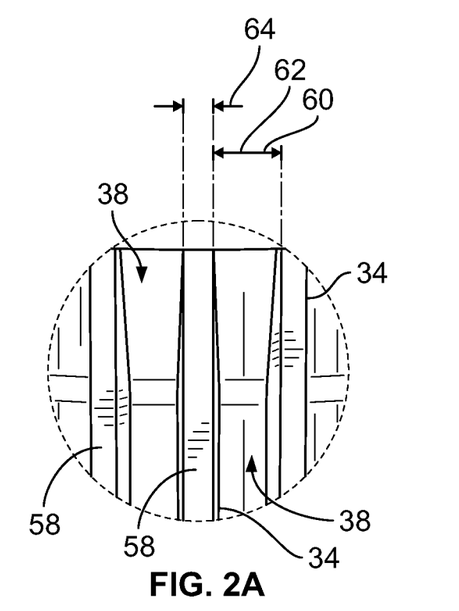
FIG. 2A is an exploded view of Detail 2A of FIG. 2.
Figure 2B:
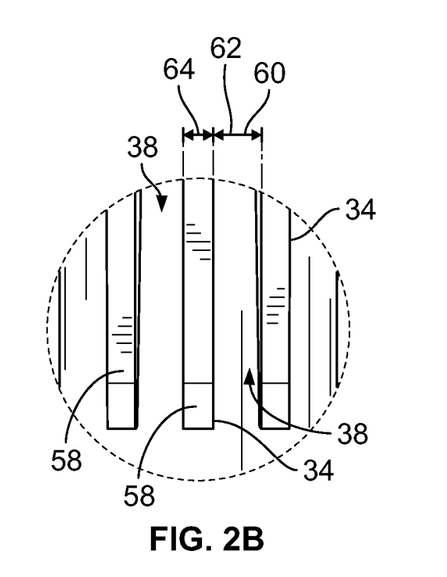
FIG. 2B is an exploded view of Detail 2B of FIG. 2.
Figure 3:
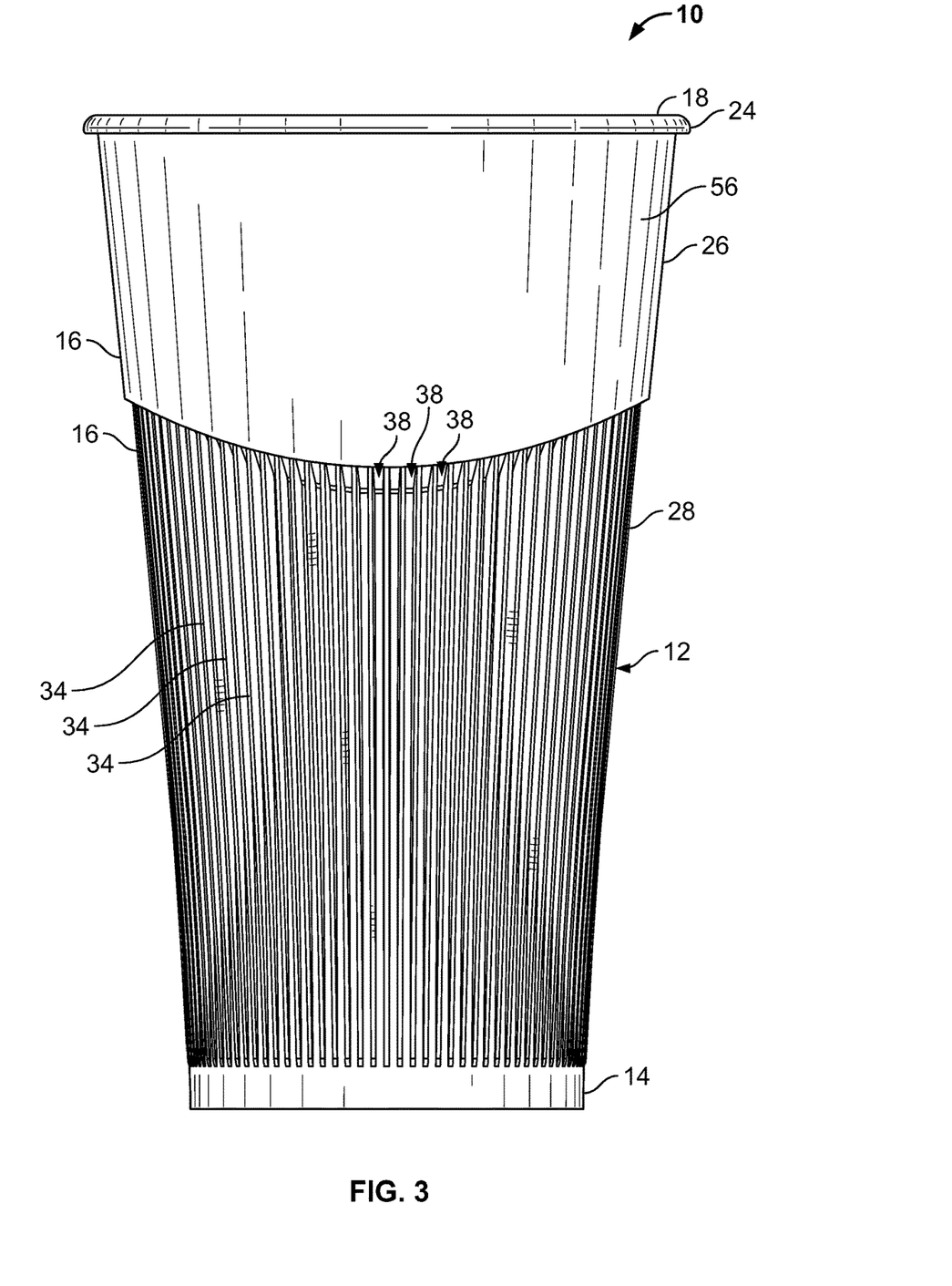
FIG. 3 is a rear view of the example cup with integrated ribbed heat sink sheath in accordance with aspects of this disclosure.
Figure 4:
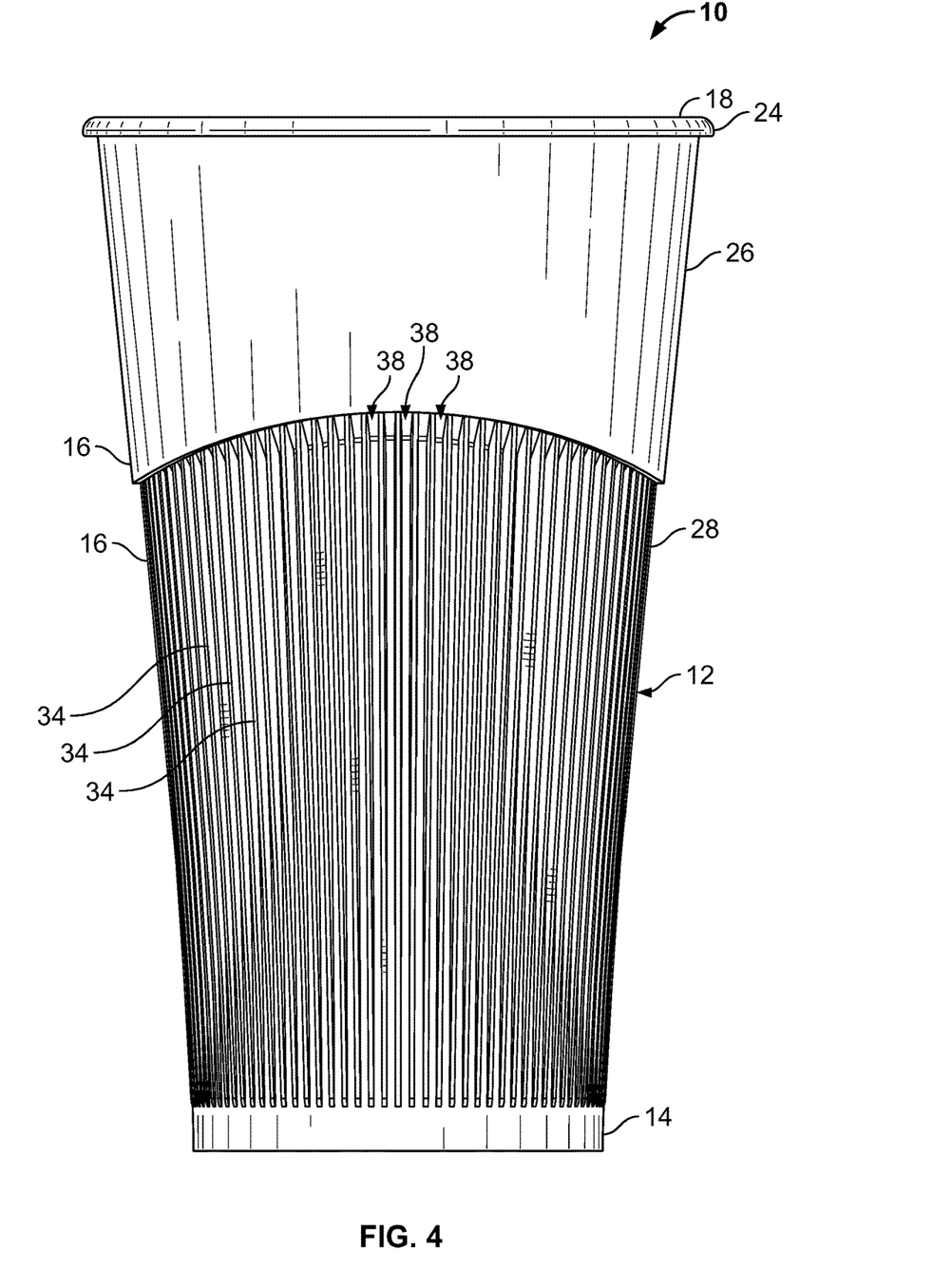
FIG. 4 is a right side view of the example cup with integrated ribbed heat sink sheath in accordance with aspects of this disclosure.
Figure 5:
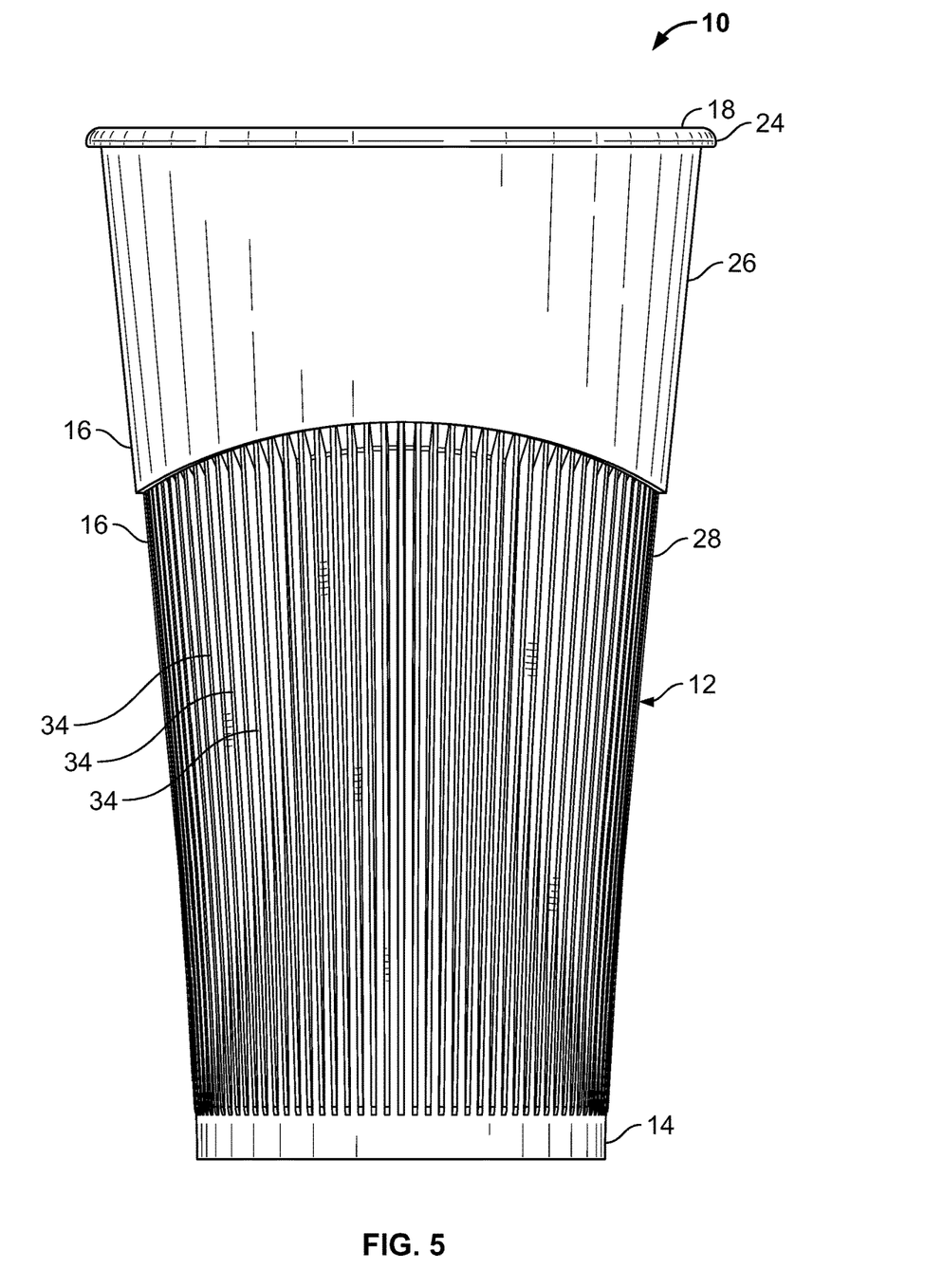
FIG. 5 is a left side view of the example cup with integrated ribbed heat sink sheath in accordance with aspects of this disclosure.
Figure 6:
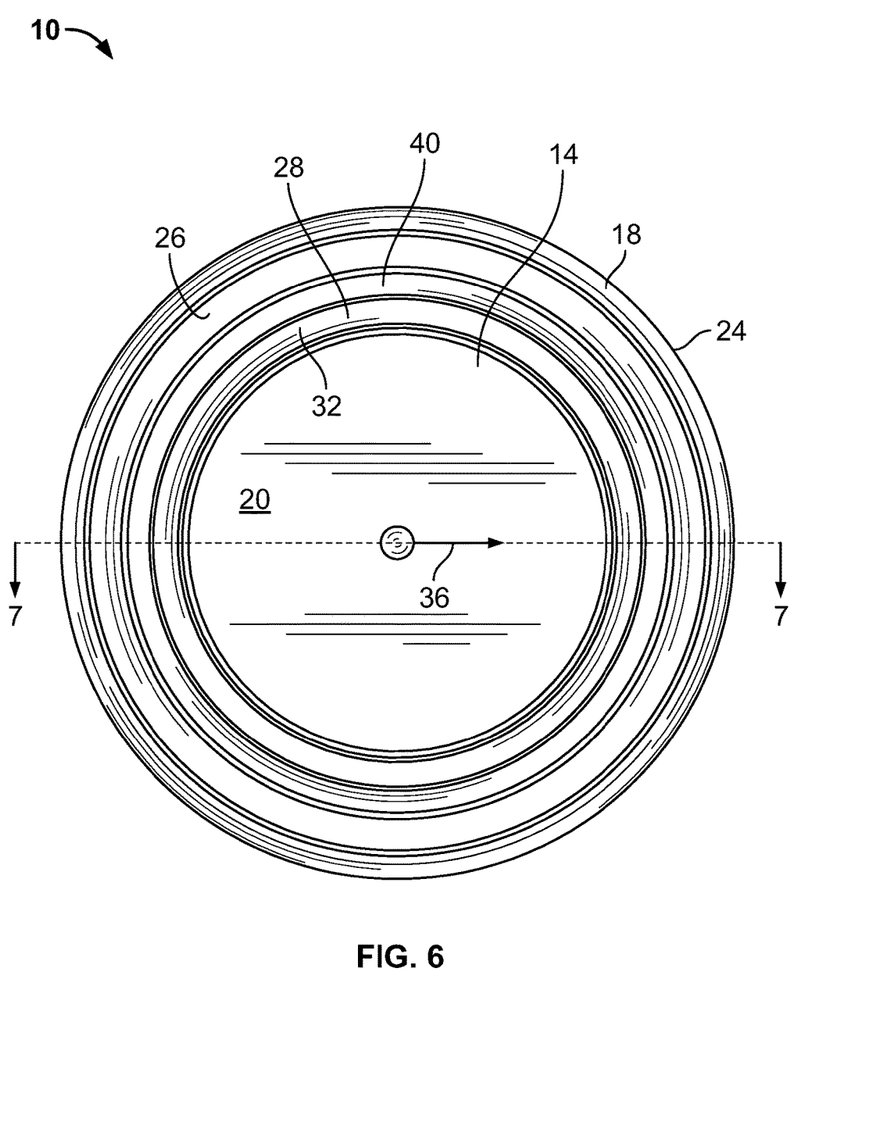
FIG. 6 is a top view of the example cup with integrated ribbed heat sink sheath in accordance with aspects of this disclosure.

Referring to FIGS. 2, 2A, and 2B, in an embodiment, the ribs 34 converge towards each other in a downward direction 30 toward the base. In an embodiment, the ribs 34 include land areas 58. A land area 58 is generally the outermost surface of the rib 34 adapted to come in contact with a hand grasping the cup 10 to drink from the cup. In an embodiment, the land area 58 can be substantially flat. In an embodiment, the land area 58 can be substantially curved. In an embodiment, the recesses 38 include recess openings 60 defined between opposing lands 58. In an embodiment, the ribs have peaks defining a maximum outward extension over a length of each rib. In an embodiment, the peaks between adjacent ribs are spaced approximately from about 0.050 inch to about 0.065 inch.

In an embodiment, a ratio of area of the openings 60 to surface area of the land areas 58 to is between about 2:1 to about 1.5:1. In an embodiment, the ratio of area of the openings 60 to surface area of the land areas 58 to is about 1.7:1. In an embodiment, a ratio of a width 62 of the recess openings 60 to width 64 of the land areas 58 to is between about 2.5:1 to about 1.75:1.

Figure 8:
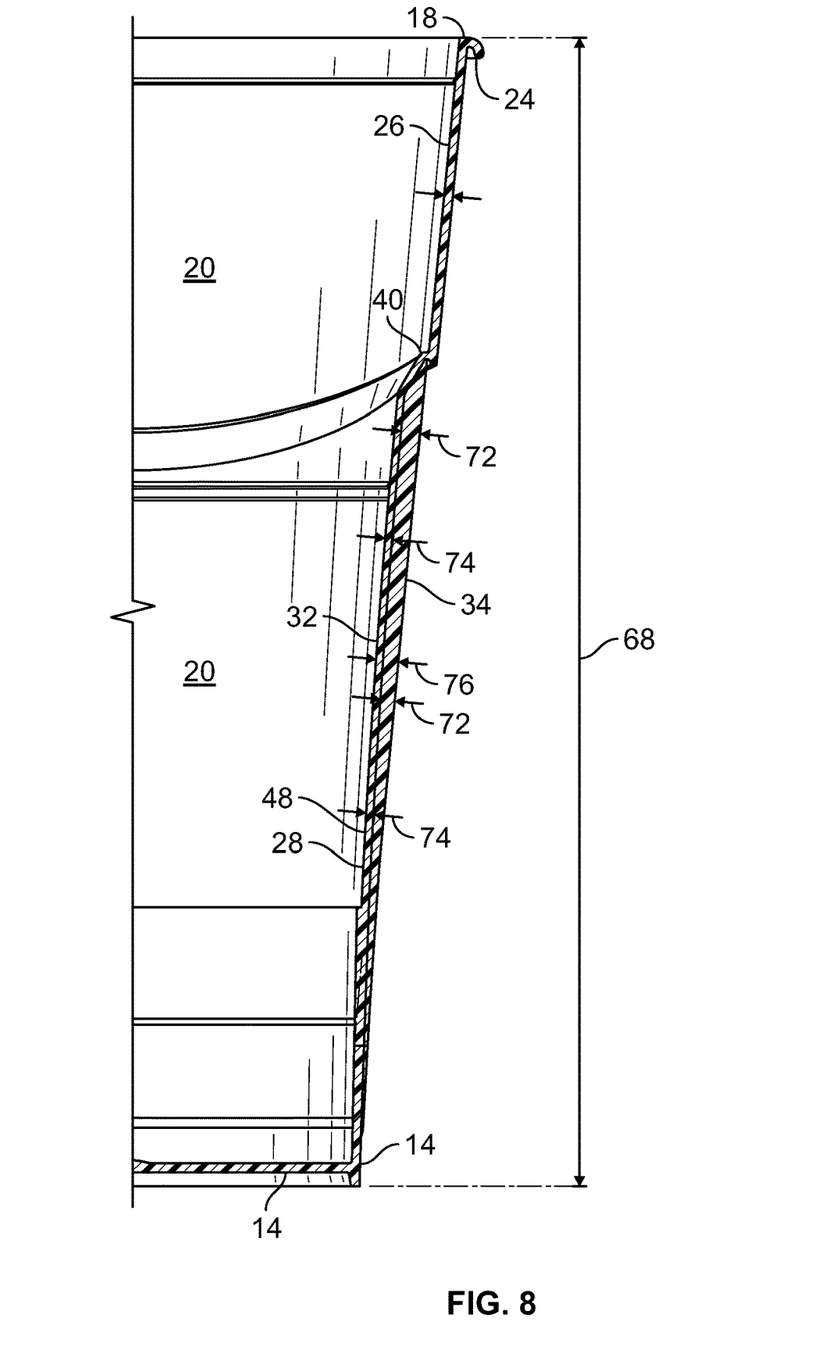
FIG. 8 is a partial vertical cross-sectional view of the example cup with integrated ribbed heat sink sheath in accordance with aspects of this disclosure.

Referring to FIG. 8, the ribs include a radial thickness 72 and the lower wall includes a radial thickness 74. In an embodiment, the radial thickness 72 of the ribs and the radial thickness 74 of the lower wall equal the radial thickness 76 of the lower sidewall 76. In an embodiment, at least a portion of the radial thickness of the ribs is about 0.93 inch to about 0.010 inch. In an embodiment, at least a portion of a radial thickness of the ribs tapers in a downward direction from the top toward the base. In an embodiment, at least a portion of the radial thickness of the ribs plus radial thickness of the lower wall is about 0.126 inch to about 0.044 inch. In an embodiment, a maximum ratio of radial thickness of the ribs to radial thickness of the lower wall is about 3:1, with 2.8:1 preferred. In an embodiment, a ratio of radial thickness of the ribs to radial thickness of the lower wall at about a half-way point of the height of the cup is about 2.5:1, with 2.3:1 preferred. In an embodiment, a ratio of radial thickness of the ribs to radial thickness of the lower wall decreases from about 3:1 to about 1:1 over at least a portion of the ribs. In an embodiment, the radial thickness of the ribs are configured to taper toward the base and the radial thickness of the ribs taper to zero proximate the base such that the lower sidewall is configured to nest within an internal cavity of an identical cup.

In an embodiment, the outer surface area of the lower sidewall is between about 200% and 250% greater than an outer surface area of the lower wall if the lower sidewall did not have the ribs. In an embodiment, the outer surface area of the lower sidewall is about 230% greater than an outer surface area of the lower wall if the lower sidewall did not have the ribs. In an embodiment, the lower sidewall includes between 56 and 136 ribs and recesses. In an embodiment, the lower sidewall includes 96 ribs and 96 recesses for a cup configured to hold 16 oz.

In an embodiment, an annular ledge 40 connects the upper sidewall 26 to the lower sidewall 28. In an embodiment, the annular ledge 40 extends inwardly from the upper sidewall 26 to the lower sidewall 28 and forms a reduction in width of the sidewall 16 between the upper sidewall 26 and the lower sidewall 28, such that a maximum width of the lower sidewall 28 is less than a minimum width of the upper sidewall 26.

Figure 9:
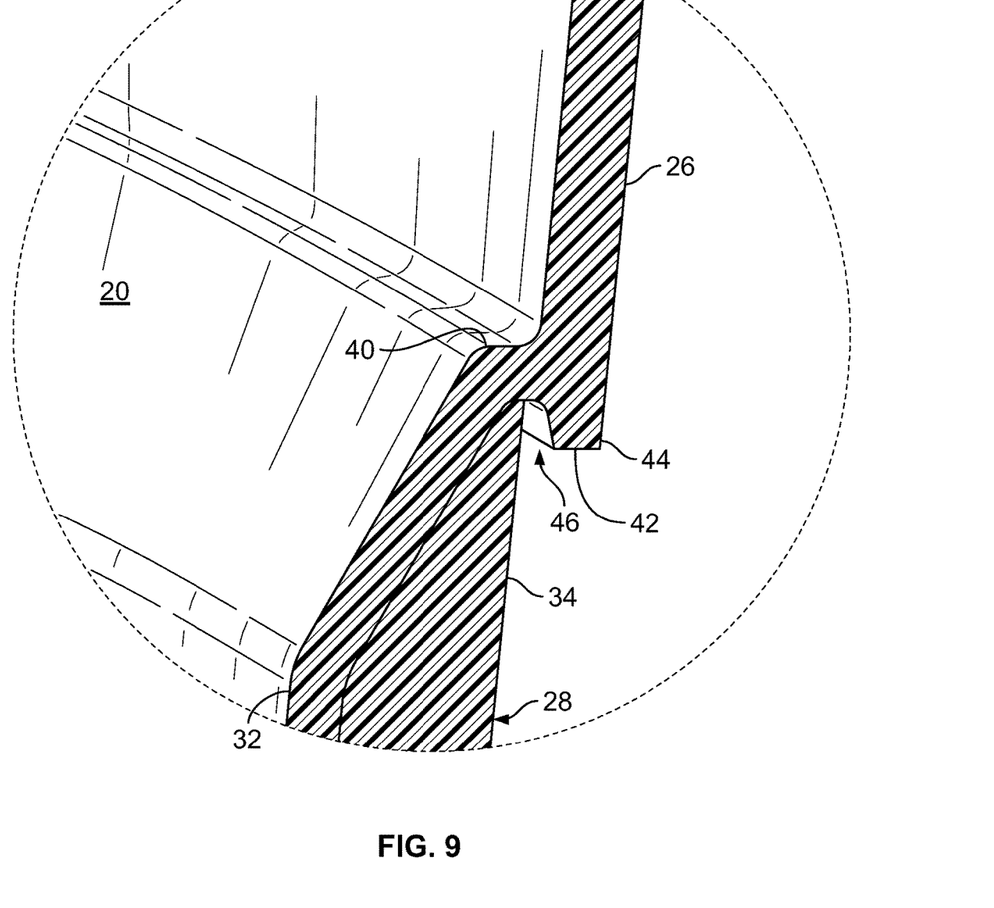
FIG. 9 is an exploded view of Detail 9 of FIG. 7.

Referring to FIG. 9, in an embodiment, the upper sidewall 26 includes an underside edge 42. In an embodiment, the underside edge 42 can be defined around a periphery of the upper sidewall to provide a bottom portion of the upper sidewall in multiple shapes. For example, in an embodiment, the bottom portion of the upper sidewall can be in the form of a horizontal, sinusoidal, curved, jagged, or other form (or combination of forms). In an embodiment, the upper sidewall includes a foot 44 extending downwardly from the bottom portion of the upper sidewall 26 and the foot includes the underside edge 42 of the upper sidewall 26. In an embodiment, the foot 44 defines a channel 46 between the upper sidewall 26 and the lower sidewall 28. In an embodiment, the channel 46 is defined annularly around the periphery of the cup. The underside edge 42 can facilitate application of in-mold label to the upper sidewall. In an embodiment, at least a portion of the upper sidewall 26 includes an outer surface 56 adapted to have an in-mold label applied to the outer surface 56. In an embodiment, the outer surface 56 of the upper sidewall is adapted to be labeled or printed on by alternative means known in the art.

Figure 10:
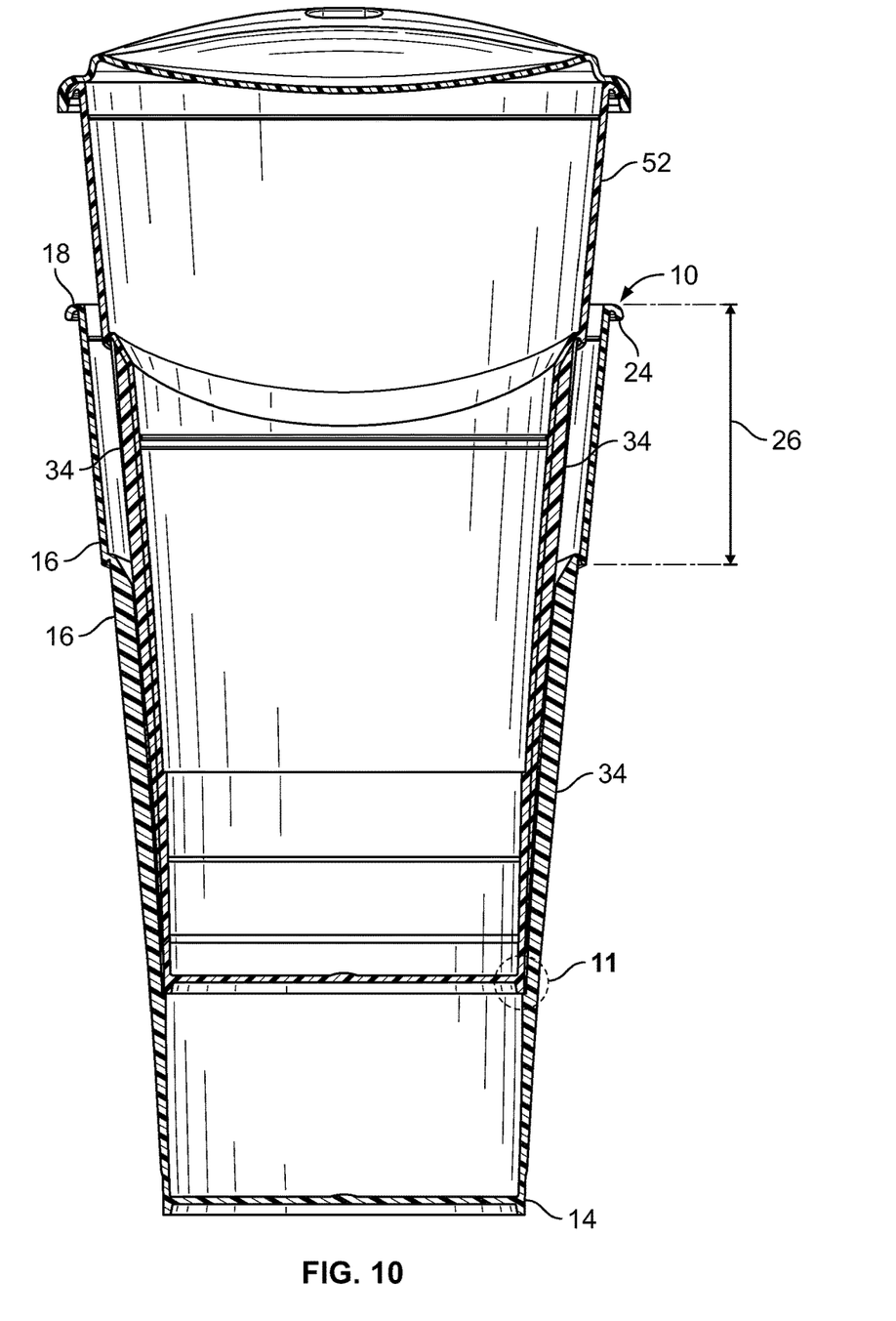
FIG. 10 is a vertical cross-sectional view of two example cups with integrated ribbed heat sink sheath in stacked formation.
Figure 11:
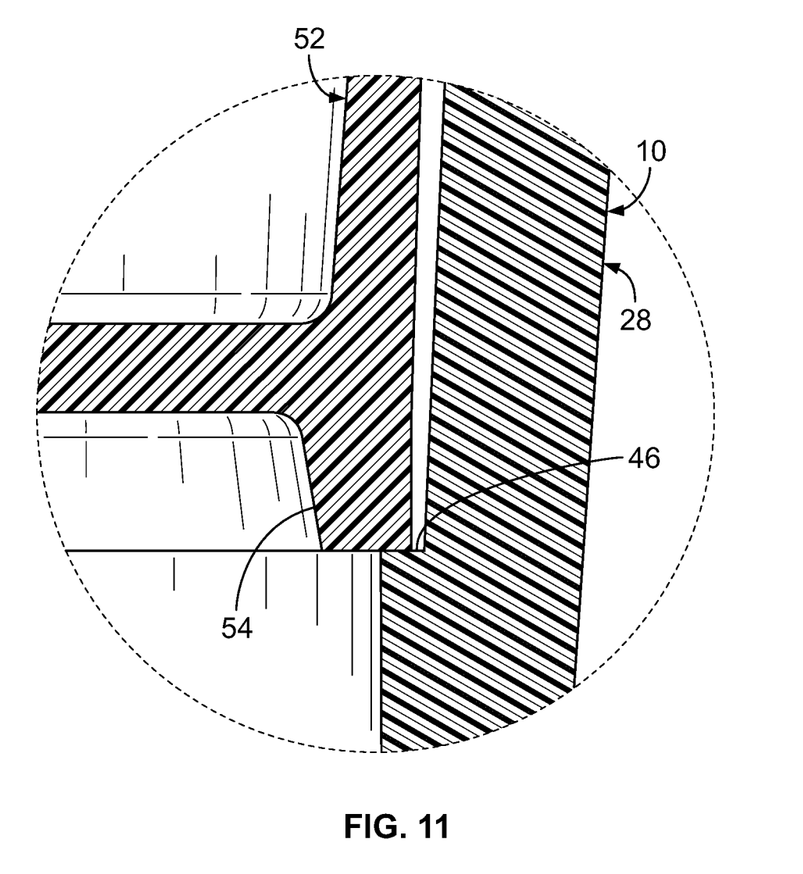
FIG. 11 is an exploded view of Detail 11 in FIG. 10.

In an embodiment, the cup 10 includes a stacking shelf 46 located on an inner surface 48 of the sidewall 16. The stacking shelf 46 extends inwardly to define a spacing 50 that is narrower than a width 322 of the base. The stacking shelf 46 can be configured to permit a second base 54 of a second identical cup 52 to rest on the stacking shelf 46 when the second identical cup 52 is received within the internal cavity 20.

In an embodiment, the cup can be constructed of a single injection molded unit. The cup can be constructed of an insulative plastic material. A preferred material is polypropylene. The configuration of the lower sidewall as disclosed herein allows for the outer surface of the cup to held comfortably while the cup contains hot liquid. A cup manufactured in accordance with embodiments of this disclosure create an particularly advantageous and effective balance between sufficient insulative property of the cup, reduced heat at the points of contact of the cup with a user's hand, comfort of use of the cup, structural integrity of the cup, and cost of manufacture. In particular, the configuration of the ratio of radial thickness of the ribs to radial thickness of the lower wall and a ratio of area of the recess openings to surface area of the land areas (alone and in combination) contribute, among other features disclosed herein, to advantages and balanced features discussed above. In addition, a cup manufactured in accordance with embodiments of this disclosure which includes an upper sidewall as disclosed herein provides the additional advantage of having a sufficient print area for labeling of the cup combined with the advantages discussed above.

Several alternative embodiments and examples have been described and illustrated herein. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. It is understood that the invention may be embodied in other specific forms without departing from the spirit or central characteristics thereof. The present examples and embodiments, therefore, are to be considered in all respects as illustrative and not restrictive, and the invention is not to be limited to the details given herein. The terms "first," "second," "top," "bottom," "left," "right," etc., as used herein, are intended for illustrative purposes only and do not limit the embodiments in any way. Additionally, the term "plurality," as used herein, indicates any number greater than one, either disjunctively or conjunctively, as necessary, up to an infinite number. The use of the term "about" preceding stated or nominal values means +/−5% of the stated or nominal value unless stated otherwise. Accordingly, while specific embodiments have been illustrated and described, numerous modifications come to mind without significantly departing from the spirit of the invention.

The invention claimed is:

1. A cup comprising:
   a base;
   a sidewall extending upward from the base to a top of the cup to define an internal cavity and an open top, wherein the sidewall comprises:
   an upper sidewall, wherein at least a portion of the upper sidewall decreases in width in a downward direction from the top toward the base;
   a lower sidewall located between the upper sidewall and the base and at least a portion of the lower sidewall decreasing in width in the downward direction, the lower sidewall having a lower wall and a plurality of raised ribs extending radially outward from the lower wall and being elongated in a direction between the top and the base, wherein the plurality of raised ribs are distributed around a periphery of the lower wall and are separated by recesses that are elongated in the direction between the top and the base;
   an annular ledge connecting the upper sidewall to the lower sidewall, wherein the annular ledge extends inwardly from the upper sidewall to the lower sidewall and forms a reduction in width of the sidewall between the upper sidewall and the lower sidewall, such that a maximum width of the lower sidewall is less than a minimum width of the upper sidewall;
   wherein the upper sidewall includes an underside edge;
   wherein the upper sidewall includes a foot extending downwardly from a bottom portion of the upper sidewall, wherein the foot includes the underside edge of the upper sidewall and the foot defines a channel between the upper sidewall and the lower sidewall, and the foot is positioned outside the maximum width of the lower sidewall such that the foot is positioned outside the plurality of raised ribs;
   wherein a maximum ratio of radial thickness of each rib of the plurality of raised ribs to radial thickness of the lower wall is about 3:1;
   wherein the plurality of raised ribs include land areas and the recesses include recess openings defined between opposing land areas, wherein a ratio of width of the openings to width of the land areas to is between about 2.5:1 to about 1.75:1; and
   wherein a ratio of radial thickness of each rib of the plurality of raised ribs to radial thickness of the lower wall decreases from about 3:1 to about 1:1 over at least a portion of each rib of the plurality of raised ribs.

2. The cup of claim 1, further comprising a stacking shelf located on an inner surface of the sidewall, wherein the stacking shelf extends inwardly to define a spacing that is narrower than a width of the base, such that the stacking shelf is configured to permit a second base of a second identical cup to rest on the stacking shelf when the second identical cup is received within the internal cavity.

3. The cup of claim 1, wherein at least a portion of the upper sidewall includes an outer surface adapted to have an in-mold label applied to the outer surface.

4. The cup of claim 1, wherein the plurality of raised ribs converge towards each other in a downward direction towards the base.

5. The cup of claim 1 wherein each rib of the plurality of raised ribs have a peak defining a maximum outward extension over a length of each rib, and wherein the peak between adjacent ribs are spaced approximately from about 0.050 inch to about 0.065 inch.

6. The cup of claim 1 wherein at least a portion of a radial thickness of the plurality of raised ribs tapers in a downward direction from the top toward the base.

7. The cup of claim 1, wherein an outer surface area of the lower sidewall is between about 200% and 250% greater than an outer surface area of the lower wall if the lower sidewall did not have the plurality of raised ribs.

8. The cup of claim 1, wherein the plurality of raised ribs include land areas and the recesses include recess openings defined between opposing land areas, wherein a ratio of area of the openings to surface area of the land areas to is between about 2.25:1 to about 1.75:1.

9. The cup of claim 1, wherein the lower sidewall includes 96 ribs and 96 recesses.

10. The cup of claim 1, wherein the plurality of ribs cover between about 70% to about 80% of a height of the cup.

11. A cup comprising:
    a base;
    a sidewall extending upward from the base to a top of the cup to define an internal cavity and an open top, wherein the sidewall comprises:
    an upper sidewall;
    a lower sidewall located between the upper sidewall and the base, the lower sidewall having a lower wall and a plurality of raised ribs extending radially outward from the lower wall and being elongated in a direction between the top and the base, wherein the plurality of raised ribs are distributed around a periphery of the lower sidewall and are separated by recesses that are elongated in the direction between the top and the base; and an annular ledge connecting the upper sidewall to the lower sidewall, wherein the annular ledge extends inwardly from the upper sidewall to the lower sidewall and forms a reduction in width of the sidewall between the upper sidewall and the lower wall;

wherein the upper sidewall includes an underside edge;

wherein the upper sidewall includes a foot extending downwardly from a bottom portion of the upper sidewall, wherein the foot includes the underside edge of the upper sidewall and the foot defines a channel between the upper sidewall and the lower sidewall, and the foot is positioned outside the maximum width of the lower sidewall such that the foot is positioned outside the plurality of raised ribs;

wherein a maximum ratio of radial thickness of each rib of the plurality of raised ribs to radial thickness of the lower wall is about 3:1;

wherein the plurality of raised ribs include land areas and the recesses include recess openings defined between opposing land areas, wherein a ratio of width of the openings to width of the land areas is between about 2.5:1 to about 1.75:1, wherein the ratio decreases over at least a portion of the lower sidewall from the top to the base; and wherein a ratio of radial thickness of each rib of the plurality of raised ribs to radial thickness of the lower wall decreases from about 3:1 to about 1:1 over at least a portion of each rib of the plurality of raised ribs.

12. The cup of claim 11, wherein an outer surface area of the lower sidewall is between about 200% and 250% greater than an outer surface area of the lower wall if the lower sidewall did not have the plurality of raised ribs.

13. The cup of claim 11, wherein the plurality of raised ribs include land areas and the recesses include recess openings defined between opposing land areas, wherein a ratio of area of the openings to surface area of the land areas to is between about 2.25:1 to about 1.75:1.

14. A cup comprising:
a base;
a sidewall extending upward from the base to a top of the cup to define an internal cavity and an open top, wherein the sidewall comprises:
an upper sidewall, wherein at least a portion of the upper sidewall decreases in width in a downward direction from the top toward the base, wherein the upper sidewall includes an underside edge and a foot extending downwardly from a bottom portion of the upper sidewall, wherein the foot includes the underside edge of the upper sidewall and the foot defines a channel between the upper sidewall and the lower sidewall;

a lower sidewall located between the upper sidewall and the base and the lower sidewall decreasing in width in the downward direction, the lower sidewall having a lower wall and a plurality of raised ribs extending radially outward from the lower wall and being elongated in a direction between the top and the base, wherein the plurality of raised ribs are distributed around a periphery of the lower wall and are separated by recesses that are elongated in the direction between the top and the base, wherein the plurality of raised ribs converge towards each other from the top toward the base, wherein a maximum ratio of radial thickness of each rib of the plurality of raised ribs to radial thickness of the lower wall is 3:1, wherein at least a portion of a radial thickness of each rib of the plurality of raised ribs tapers from the top toward the base, wherein an outer surface area of the lower sidewall is between 200% and 250% greater than an outer surface area of the lower wall if the lower sidewall did not have the plurality of raised ribs, wherein a length of each rib the plurality of raised ribs is between 70% to 80% of a height of the cup;

an annular ledge connecting the upper sidewall to the lower sidewall, wherein the annular ledge extends inwardly from the upper sidewall to the lower sidewall and forms a reduction in width of the sidewall between the upper sidewall and the lower sidewall, such that a maximum width of the lower sidewall is less than a minimum width of the upper sidewall;

wherein the upper sidewall includes an underside edge;

wherein the upper sidewall includes a foot extending downwardly from a bottom portion of the upper sidewall, wherein the foot includes the underside edge of the upper sidewall and the foot defines a channel between the upper sidewall and the lower sidewall, and the foot is positioned outside the maximum width of the lower sidewall such that the foot is positioned outside the plurality of raised ribs;

wherein the plurality of raised ribs include land areas and the recesses include recess openings defined between opposing land areas, wherein a ratio of width of the openings to width of the land areas to is between about 2.5:1 to about 1.75:1; and wherein a ratio of radial thickness of each rib of the plurality of raised ribs to radial thickness of the lower wall decreases from about 3:1 to about 1:1 over at least a portion of each rib of the plurality of raised ribs.

* * * * *